Aug. 25, 1942.                P. T. LINDHARD                    2,293,992
                    APPARATUS FOR THE MANUFACTURE OF CEMENT
                         Filed July 1, 1941          3 Sheets-Sheet 1
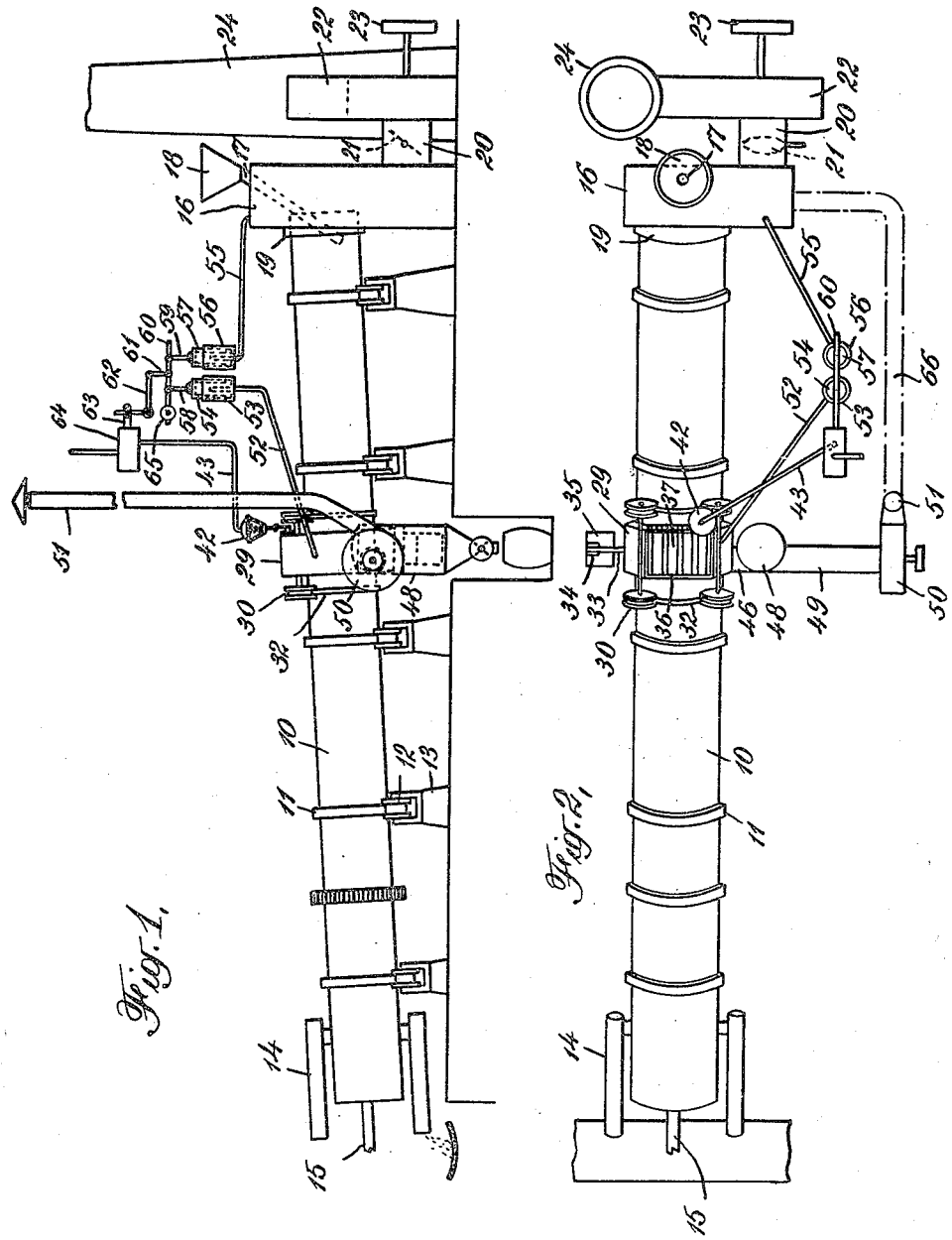
INVENTOR
Tove T. Lindhard
BY
ATTORNEYS

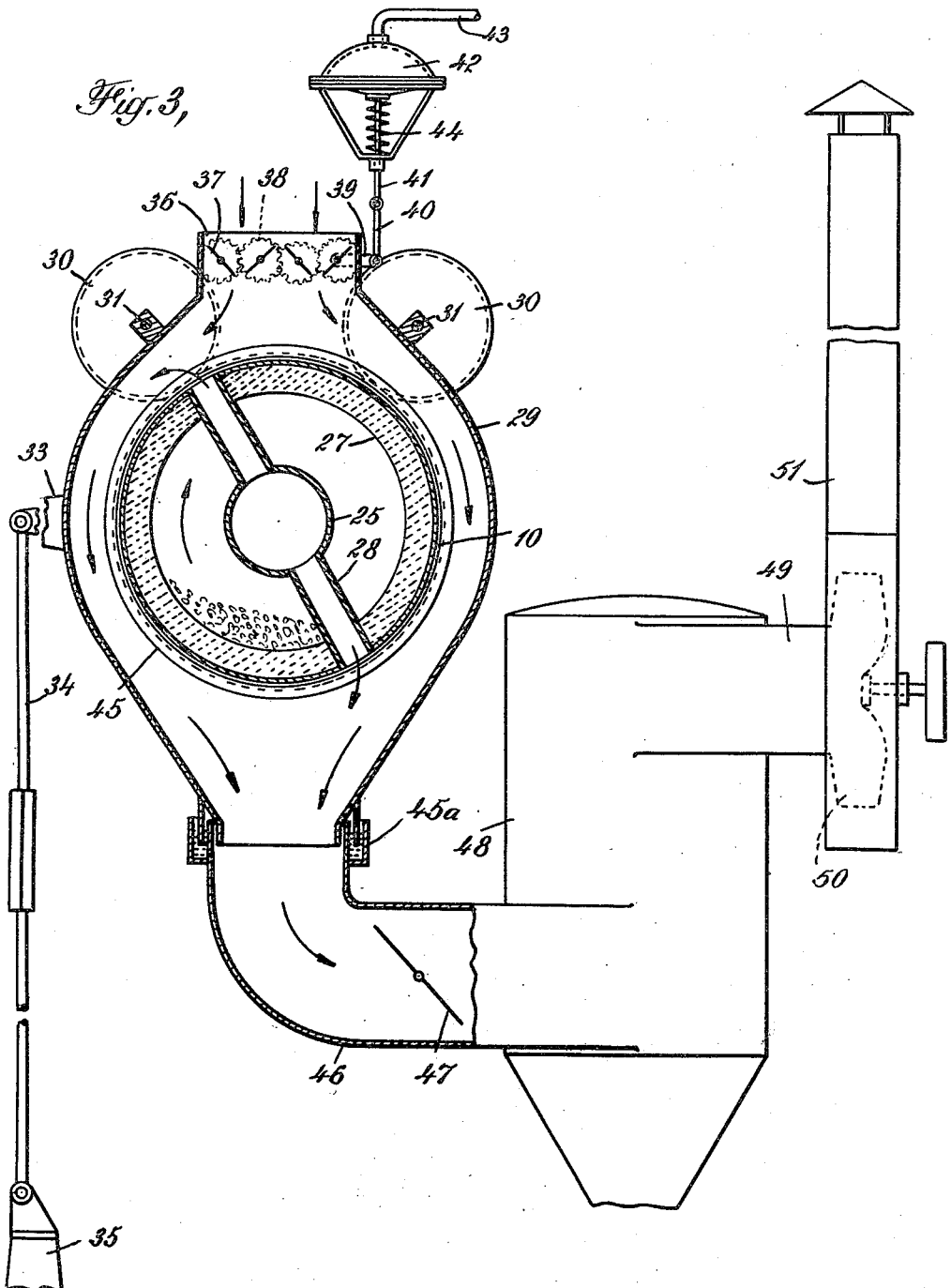

Patented Aug. 25, 1942

2,293,992

UNITED STATES PATENT OFFICE 2,293,992

APPARATUS FOR THE MANUFACTURE OF CEMENT

Povl T. Lindhard, Rumson, N. J., assignor to F. L. Smidth & Co., New York, N. Y., a corporation of New Jersey Application July 1, 1941, Serial No. 400,636

7 Claims. (Cl. 263—33)

This invention relates to the manufacture of Portland cement and is concerned more particularly with a novel apparatus for the production of Portland cement by the burning of raw materials, which is provided with means by which the alkali content of the cement clinker may be controlled.

As is well known, most cement raw materials contain alkalis or alkaline compounds in greater or less amounts and, as these raw materials enter the clinkering zone of the kiln, a portion of the alkalis and alkaline compounds are volatilized and are carried by the exhaust gases toward the stack end of the kiln. As the gases pass up the kiln, the alkali fumes condense into very fine particles and a portion of the particles is caught and mixed with the raw materials entering the kiln and passing toward the clinkering zone. In that zone, the alkalis and their compounds are again volatilized and the cycle of volatilization and condensation continues until the hot gases between the clinkering zone and the feed end of the kiln contain a considerable concentration of alkali fumes. The alkali content in the clinker, as well as that of the stack gases, increases until a balance is reached and, as only a portion of the alkaline substances are volatilized, the amount thereof in the clinker after a period of operation may be such as to impair the quality of the finished cement. The lower the temperature of the stack gases, the greater is the amount of the alkalis reabsorbed and the greater the alkali content of the clinker, so that a kiln operating with the greatest heat economy in the course of time produces clinker having the greatest alkali content.

The present invention is concerned with an apparatus for producing cement which may take the form of a long economical kiln, which includes means by which the alkali content of the clinker may be kept within permissible limits and this result is obtained with little heat loss. In the use of the apparatus, a portion of the gases containing alkali fumes is withdrawn at a point down the kiln where the temperature is still high enough to prevent reabsorption of the alkali in the raw material and the remainder of the gases passes out through the stack in the usual way. The relative proportions of the gases withdrawn at high temperature and those leaving the feed end of the kiln are then controlled by maintaining a differential draft between the points of egress.

The new apparatus in its preferred form includes a kiln having passages leading from the interior thereof through the kiln shell and opening into a mantle which is disposed down the kiln at a point where the temperature of the gases is sufficiently high to prevent reabsorption of the volatile alkaline substances but not high enough to detrimentally affect the metal parts of which the passages, mantle, etc. are made. The mantle has an inlet for atmospheric air and it is connected to a separator and a fan and the fan causes air to be drawn into the mantle and hot gases to be withdrawn from the kiln into the mantle. The air thus mixed with the gases in the mantle reduces the temperature of the gases, so that injury to the mantle, separator, and fan is avoided. The amount of air admitted into the mantle determines the pressure within the latter and that, in turn, determines the amount of hot gases withdrawn into the mantle. The amount of the gases thus withdrawn is varied in proportion to the amount of the gases leaving the kiln at the feed end and, in the operation of the apparatus, such an amount of gases is withdrawn into the mantle as may be necessary to keep the alkali content of the clinker within the desired limits.

For a better understanding of the invention, reference may be had to the accompanying drawings in which Fig. 1 is a longitudinal elevational view of the new apparatus;

Fig. 2 is a plan view of the apparatus;

Fig. 3 is a view, partly in transverse section and partly in elevation, of the apparatus shown in Figs. 1 and 2.

Figure 4:
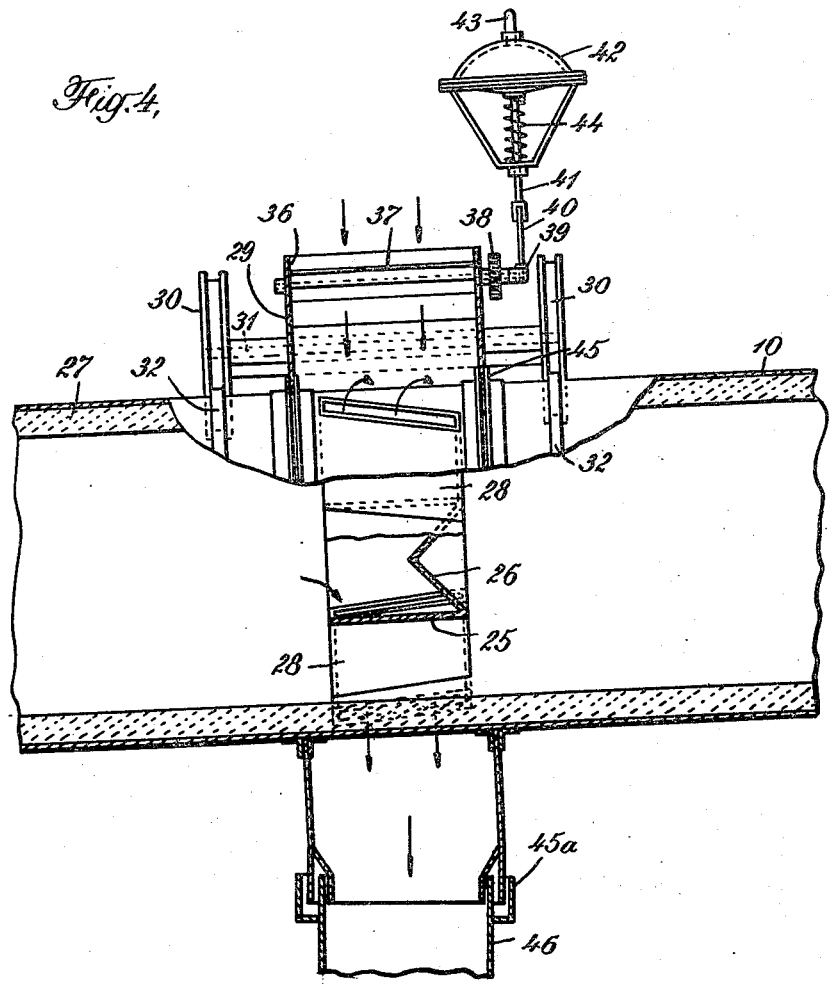
Fig. 4 is a partial longitudinal view through the kiln, with parts broken away.

The apparatus illustrated includes an inclined rotary kiln 10 provided with tires 11 running on rollers 12 on foundations 13 in the usual manner. The kiln is provided with an attached cooler 14 and a combustible mixture is introduced into its lower end through a burner 15. The upper end of the kiln extends into a dust chamber 16 and the raw material is fed into the kiln through a feed pipe 17 from a hopper 18. Ingress of air into the dust chamber around the end of the kiln is prevented by a seal 19 and the dust chamber is connected by a duct 20 containing a damper 21 to the intake side of a draft fan 22. The fan is driven by a pulley 23 and discharges into a stack 24.

Mounted within the kiln between the hot zone and the upper end is a housing 25, which is preferably cylindrical is shape and is closed at its upper end by a deflector cone 26. The housing is mounted free of the lining 27 of the kiln and it is located at a point below the feed end of the kiln where the temperature is high enough to prevent reabsorption of the alkali in the hot gases by the material passing down the kiln but not so near the hot zone as to endanger the life of the metal parts of which it is constructed. A pair of hollow members 28 provide passages leading from the housing through the kiln shell and the kiln lining to openings in the kiln shell and the members are parallelogram in section and so shaped and disposed as to promote the conveyance of the material past them through the kiln.

The passages for hot gases from the interior of the kiln through the kiln shell lead into the interior of a mantle 29 which encircles the kiln and may conveniently be supported by means of wheels 30 mounted on shafts 31 attached to the mantle and operating and riding on tracks 32 attached to the kiln shell. The mantle is provided with a torsion member 33 to which is secured a strut 34 connected to a foundation member 35 and the strut and torsion member prevent the mantle from rotating with the kiln. The strut may be adjustable in length to permit proper positioning of the mantle.

The mantle is provided with an air inlet 36 across which extend a plurality of dampers 37 mounted on shafts which are connected together by pinions 38. One end shaft is provided with a crank 39 connected by a link 40 to one end of a rod 41, the other end of the rod being attached to a diaphragm which is secured between flanges in a head 42. Compressed air is supplied to the interior of the head through a pipe 43, and a spring 44 encircling the rod 41 and bearing at one end against a part of the rod and at the other against a part of the head resists downward movement of the rod produced by the action of the compressed air on top of the diaphragm.

The vertical walls of the mantle lie between rings 45 attached to the kiln and serving to prevent air from entering the mantle along the surface of the kiln and, at its lower end, the mantle is connected through a water seal 45a to a duct 46 containing a damper 47 and leading to a separator 48 of the cyclone type. A duct 49 from the top of the cyclone leads to an auxiliary fan 50 discharging into stack 51.

In the operation of the apparatus, a differential draft is maintained between the dust chamber 16 and the gas mantle 29 and the flow of gas through the passages 28 from the kiln into the mantle is controlled, so that the amount of gases withdrawn into the mantle is in proportion to the amount of gases discharged at the feed end of the kiln. For the purpose of exercising such control, means are employed which are responsive to the pressures within the mantle and the chamber and such means include a pipe 52 leading from the interior of the mantle through the bottom of a vessel 53 into a bell 54 partially submerged in the vessel. A similar pipe 55 leads from the interior of the dust chamber 16 through the bottom of the vessel 56 containing liquid into a bell 57 partially submerged in the vessel. The bells 54, 57 are attached by links 58, 59 to a lever 60, which is connected by a link 61 to one arm of a bell crank lever 62, the other arm of which is connected to the stem 63 of a valve 64, which controls the flow of compressed air into the line 43. A counterweight 65 is mounted for adjustment along the lever 60 and may be moved to different positions, as desired.

With the apparatus described, the action of the fan 50 produces a reduced pressure within the mantle 29 and this causes hot gases from the interior of the kiln to be drawn through housing 25 and passages 28 into the mantle. Atmospheric air is also drawn into the mantle through inlet 36 and the position of the dampers 37 determines the amount of air admitted and of hot gases leaving the kiln and entering the mantle. The counterweight 65 is disposed along lever 60, so that the desired difference in draft will be maintained within the dust chamber and mantle and, if any variation in the pressure differential occurs, the lever 60 will be moved and this will, in turn, alter the operation of valve 64. The change in the condition of the valve will, in turn, cause the dampers 37 to be swung either toward open or closed position and the amount of air admitted into the mantle through the inlet will be altered to correct for the variation.

In the construction illustrated, the mantle is provided with an air inlet at the top and is connected at the bottom to the cyclone separator. If desired, however, the mantle may be reversed with the inlet in the bottom and the connection at the top.

The apparatus described includes two stacks, but, if desired, the fan 50 may be connected, as illustrated in Fig. 2, by the flue 66 to the dust chamber or fan 50 may discharge directly into stack 24, these variations depending upon the capacity of the fan 22. In all instances, a differential draft between the mantle and the dust chamber is maintained and thus causes continuous withdrawal from the kiln of alkali-containing gases and thus makes possible control of the alkali content in the clinker.

I claim:

1. Apparatus for the manufacture of cement, etc., which comprises an inclined rotary kiln, a dust chamber at the upper end of the kiln, means for introducing raw material into the kiln at its upper end, a burner for introducing a combustible mixture into the lower end of the kiln, combustion of the mixture producing a hot zone near the lower end of the kiln, a mantle encircling the kiln between its upper end and the hot zone, passages leading from the interior of the kiln through the shell thereof into the mantle, means for drawing hot gases from the kiln into the dust chamber, means for drawing atmospheric air into the mantle and also drawing hot gases from the kiln through the passages into the mantle, and means for regulating the relative amounts of air and hot gases entering the mantle.

2. Apparatus for the manufacture of cement, etc., which comprises an inclined rotary kiln, a dust chamber at the upper end of the kiln, means for introducing raw material into the kiln at its upper end, a burner for introducing a combustible mixture into the lower end of the kiln, combustion of the mixture producing a hot zone near the lower end of the kiln, a mantle encircling the kiln between its upper end and the hot zone, passages leading from the interior of the kiln through the shell thereof into the mantle, means for maintaining a reduced pressure in the dust chamber, means for maintaining a reduced pressure in the mantle and thereby withdrawing a portion of the hot gases from the kiln into the mantle, and means responsive to the difference in the pressures in the dust chamber and mantle for regulating the amount of the gases withdrawn into the mantle.

3. Apparatus for the manufacture of cement, etc., which comprises an inclined rotary kiln, an open-ended housing within the kiln toward the upper end thereof, passages leading from the interior of the housing and opening through the kiln shell, a mantle encircling the kiln, the passages leading to the interior of the mantle, and means for maintaining a reduced pressure in the mantle to draw hot gases through the passages into the mantle from the interior of the kiln.

4. Apparatus for the manufacture of cement, etc., which comprises an inclined rotary kiln, an open-ended housing within the kiln toward the upper end thereof, passages leading from the interior of the housing and opening through the kiln shell, a mantle encircling the kiln, the passages leading to the interior of the mantle, a controlled inlet for atmospheric air into the mantle, and means for maintaining a reduced pressure in the mantle to draw in atmospheric air and also to draw hot gases through the passages into the mantle from the interior of the kiln.

5. Apparatus for the manufacture of cement, etc., which comprises an inclined rotary kiln, an open-ended housing within the kiln toward the upper end thereof, passages leading from the interior of the housing and opening through the kiln shell, a mantle encircling the kiln, the passages leading to the interior of the mantle, a separator connected to the mantle, and a fan for drawing hot gases through the passages into the mantle from the interior of the kiln and also drawing said gases through the separator.

6. Apparatus for the manufacture of cement, etc., which comprises an inclined rotary kiln, an open-ended housing within the kiln toward the upper end thereof, passages leading from the interior of the housing and opening through the kiln shell, a mantle encircling the kiln, the passages leading to the interior of the mantle, a controlled inlet for atmospheric air into the mantle, a separator connected to the mantle, and a fan for drawing atmospheric air into the mantle and for drawing hot gases from the interior of the kiln through the passages into the mantle and passing the mixture of air and gases through the separator.

7. Apparatus for the manufacture of cement, etc., which comprises an inclined rotary kiln, a dust chamber at the upper end of the kiln, means for introducing raw material into the kiln at its upper end, a burner for introducing a combustible mixture into the lower end of the kiln, combustion of the mixture producing a hot zone near said lower end, a mantle encircling the kiln between its upper end and the hot zone, an inlet for atmospheric air into the mantle, means for controlling the inlet, means for maintaining a reduced pressure in the dust chamber, means for maintaining a reduced pressure within the mantle, whereby atmospheric air is drawn into the mantle through the inlet and hot gases from the interior of the kiln are drawn through the passages into the mantle, and means responsive to the difference in the pressures within the dust chamber and mantle for regulating the inlet control means.

POVL T. LINDHARD.